J. V. PUGH.
WIRE SPOKED WHEEL.
APPLICATION FILED JAN. 18, 1910.
1,047,702.
Patented Dec. 17, 1912.
4 SHEETS—SHEET 1.
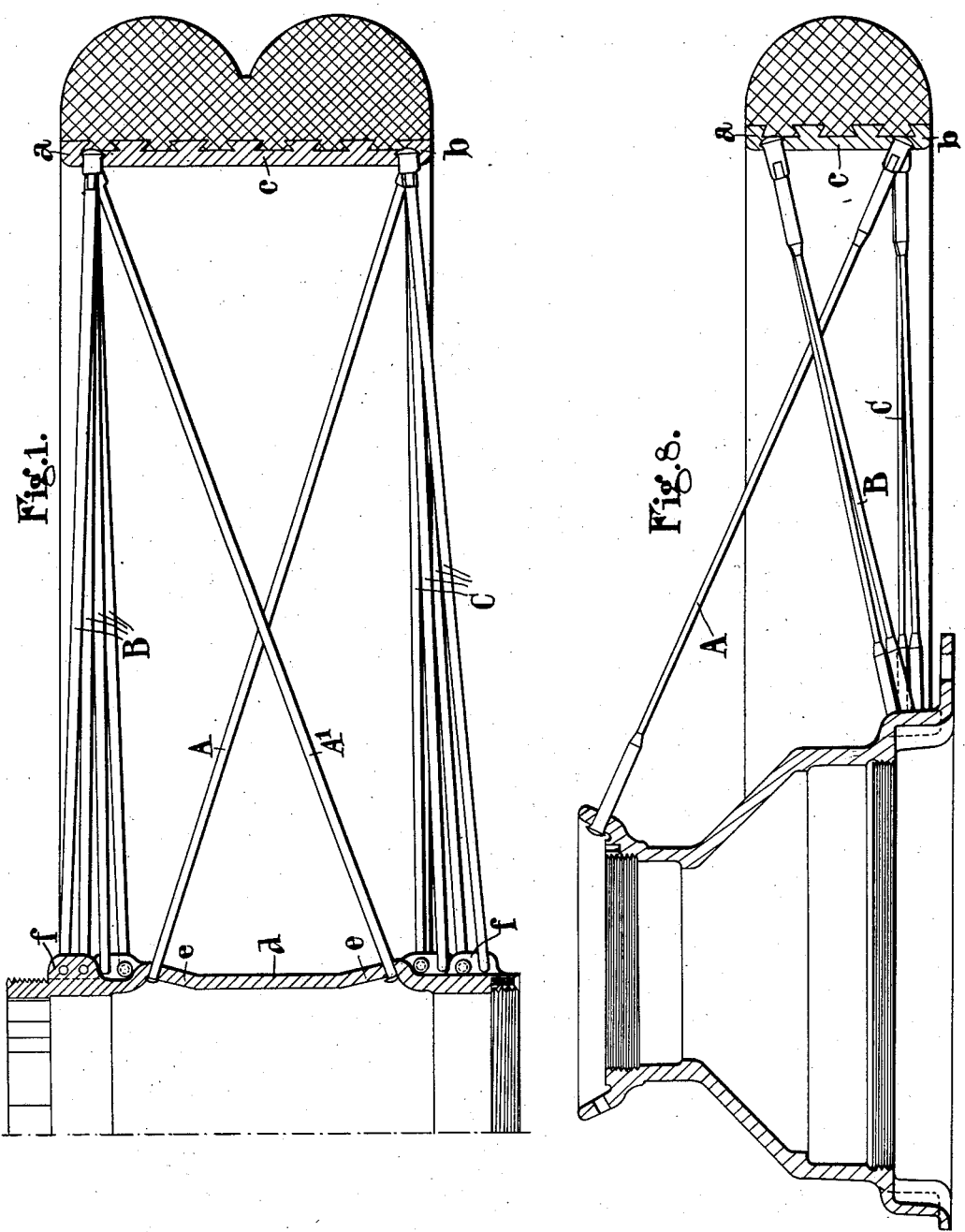

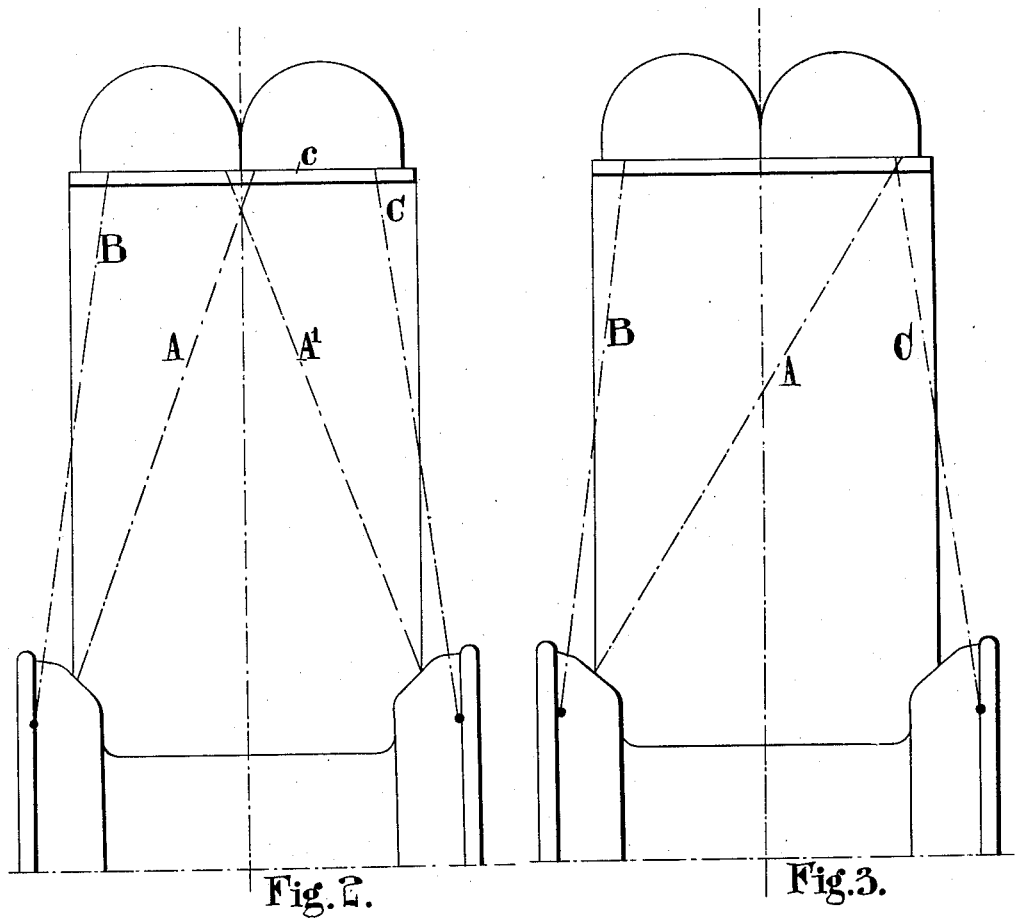

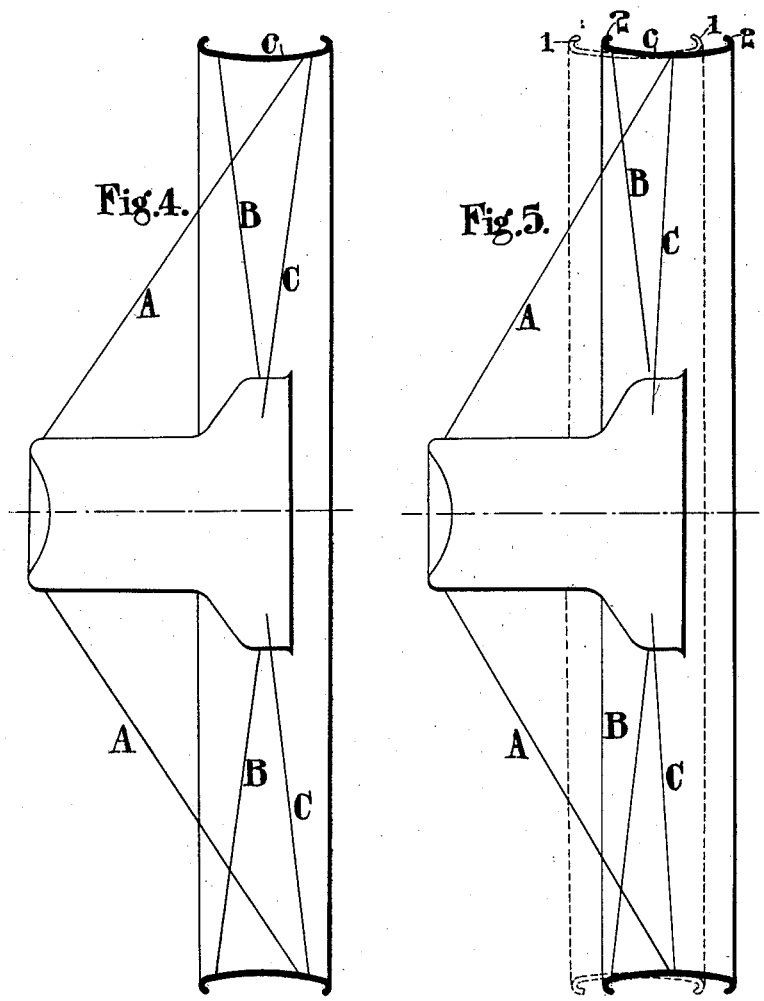

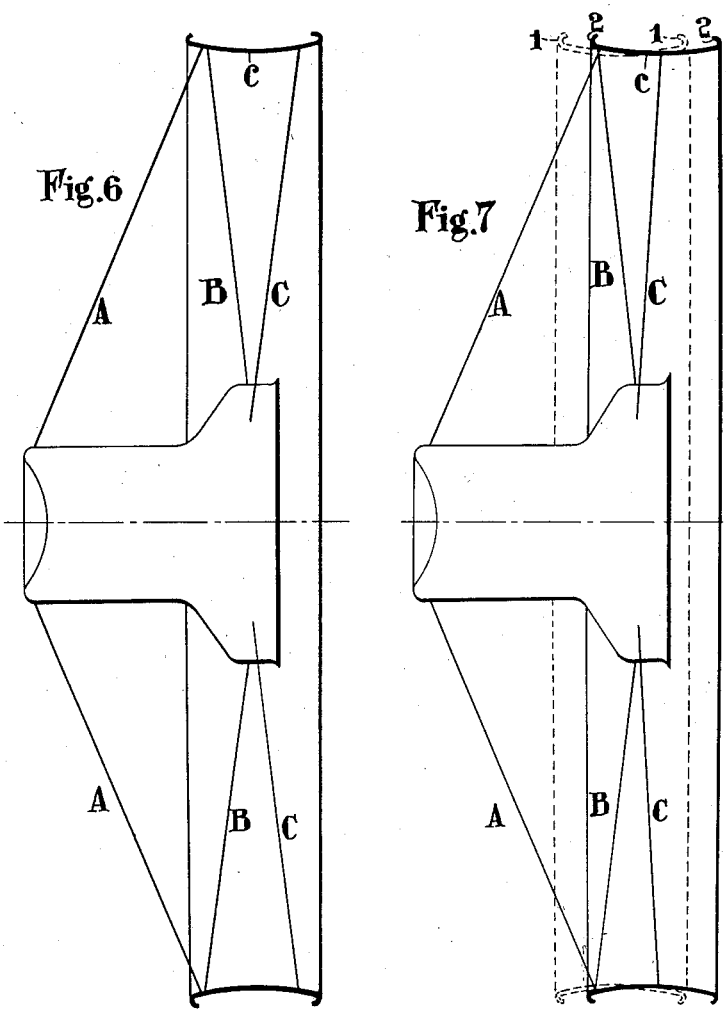

UNITED STATES PATENT OFFICE.

JOHN VERNON PUGH, OF ALLESLEY, ENGLAND.

WIRE-SPOKED WHEEL.

1,047,702.   Specification of Letters Patent.   Patented Dec. 17, 1912.

Application filed January 18, 1910. Serial No. 538,774.

*To all whom it may concern:*

Be it known that I, JOHN VERNON PUGH, a subject of the King of Great Britain and Ireland, and residing at Guiting House, Allesley, in the county of Warwick, England, have invented certain new and useful Improvements in Wire-Spoked Wheels, of which the following is a specification.

This invention relates to improvements in wire spoked wheels for motor and other vehicles and is specially applicable in the case of wheels for heavy vehicles such as motor omnibuses and the like.

The back wheels of such heavy motor vehicles are usually very broad but the exigencies of design and other causes tend to limit the length of the spoke base of the hubs and the margin of strength of such wheels when sudden shocks occur, such as when the vehicle slips against a curb, may therefore be small.

One object of my invention is to provide a wire spoked wheel for heavy vehicles in which, although the rim is broad and the width of the spoke base is still limited by present conditions, a large increase of strength shall be obtained against side shocks and forces.

The invention consists in a wire spoked wheel in which the rim is carried by two sets of spokes and two or more sets of additional spokes are provided, said spokes being disposed at considerable inclination to the central plane of the wheel so as to give lateral strength and rigidity to the wheel.

When the wheel is used as a driving wheel the two sets of spokes first mentioned in the next preceding paragraph take the transmission forces and the additional spokes take the side forces.

Referring to the accompanying drawings; Figure 1 is a half vertical cross section of a back wheel for a heavy vehicle such as a motor omnibus; Figs. 2 and 3 are diagrams of similar wheels showing slightly modified arrangements of spoking; Fig. 4 is a diagram of a wheel in which both sets of transmission spokes are connected to the inner end of the hub. Fig. 5 is a diagram of a slightly modified form of Fig. 4. Fig. 6 is a further modification in which the spokes which take side forces are connected to the outside of both hub and rim. Fig. 7 represents a slight modification of the arrangement according to Fig. 6. Fig. 8 is a part vertical cross sectional view of a front wheel for a heavy vehicle, having spoking in accordance with the present invention.

In carrying out the invention in one way as illustrated in Fig. 1, for the driving wheel of a heavy motor vehicle, the two sides, $a$ and $b$, of the rim, $c$, are connected to the corresponding ends of the hub, $d$, by sets of spokes B, C, these spokes being preferably tangential. The ends of the hub are also connected to the remote sides of the rim by two other sets of spokes, A, $A^1$, which are preferably arranged in radial planes. The portions $e$, of the hub, $d$, in which the spokes, A, $A^1$, fasten are preferably formed to provide a surface at right angles to them. The ends of the hub may be formed with projecting lugs, $f$, $f$, into which the bent ends of the spokes, B, C, are secured. The other ends of the spokes may be fastened in countersunk holes in the rim in any convenient manner. In this arrangement the spokes, B and C, transmit the most driving and braking forces and the spokes, A and $A^1$, take most of the side forces. In a modification of the invention the additional spokes, $A^1$, $A^2$, instead of being connected near the sides of the rim as in Fig. 1, may be connected near the central plane of the wheel as shown in Fig. 2. In both cases however it is desirable that all the spokes shall pass through the central plane of the wheel at the same distance in that plane from the axis of the hub.

Instead of providing two sets of spokes, A, $A^1$, only one set may be employed in which case the cross spokes are connected to the outer end of the hub and to a part of the rim situated to the inner side of the wheel center, as shown for example in Fig. 3, which illustrates the spokes, A, attached to the inner side of the rim, $c$, the other spokes being the same as B and C in Fig. 1. In some cases the central plane of the tread may pass through the hub to the inside of the central plane of rotation of the hub and so long as the distance between the two planes is small, any of the arrangements of spoking described may be employed but it is very advantageous in certain cases to make the distance between the planes considerable, as for example when a wire spoked wheel is to be mounted upon the axle of a vehicle which was designed for use with wood spoked wheels. When thus substituting a wire spoked wheel for a wood spoked wheel it has hitherto usually been found that owing to the increased length of the hub of the detachable wire spoked wheel, a considerable increase has occurred in the distance between the center line of the axle bearing and the center line of the tire.

A further object of this invention is to construct a wire spoked wheel in such a manner that the rim may be arranged in any required position with regard to the hub, so that when substituting the wire spoked wheel for a wood spoked wheel the distance between the center of the hub and the center of the rim may be kept substantially the same as is found when the ordinary wood spoked wheels are used. This is accomplished according to the present invention by arranging the center of the tire rim nearly over the flange part of the inner end of the hub and using the same sets of spokes, A, B, C, but in order that both sets of spokes B and C may perform their proper function, i. e. the taking of transmission forces, they are both connected to the end of the hub which is nearest to the central plane of the rim, the spokes A, which take the side forces being arranged as before to connect the rim with the outer end of the wheel hub. Such a wheel is shown in the diagram Fig. 4, the rim c being connected at both sides by the sets of spokes B and C, to the inner flange of the hub, while the set of spokes A, connects the outer end of the hub with the inner side of the rim c.

In the arrangement according to Fig. 4, the spokes, A, are preferably always radial or tangential to a small circle, but the spokes, B, may be radial and the spokes, C, tangential to a large circle in both directions or the spokes, B and C, may both be tangential some of each set being in one direction and some of each set in the other direction; or the spokes B, may all be tangential to a large circle in one direction; all the spokes, C, being tangential in the opposite direction. A front wheel constructed in accordance with this diagram is represented in Fig. 8, similar lines indicating the corresponding parts. In this front wheel as also in the wheel according to Fig. 1, the tire is represented as being vulcanized directly to the rim but the method of securing the tire to the rim forms no part of the present invention. A slight modification is shown in Fig. 5 where the spokes, B and C, are arranged closer together and the position of the rim relatively to the spokes and hub may be as shown by dotted lines 1, 1, or full lines 2, 2. Similar arrangements as regards the direction of the spoking may be adopted as is above described with reference to Fig. 4.

In the modification shown in Fig. 6, spokes, A, connect the outside of the rim with the outside end of the hub; the spokes, B, and C, are as before described and may be arranged either radially or tangentially in the manner described with reference to Fig. 4. The spokes, B and C, may be arranged closer together as shown in Fig. 7 and the rim may be arranged in either of the positions shown by the dotted lines 1, 1, or the full lines 2, 2. It will be understood of course that the rim may be of any convenient form suitable for the nature of the tire with which the wheel is to be provided.

This invention is not only important where detachable wheels have to be fitted to a car which was designed for use with wood wheels but it enables the tread to be so positioned with regard to the hub that the center line of the steering pivot can be made to intersect the central plane of the tread substantially at the point of contact of the latter with the road. This is of particular importance when front brakes are used, since any other position of the center line of the steering knuckle in relation to the tread of the wheel is liable to cause the vehicle to swing around if one of the brakes held tighter than the other.

It will be understood that wheels in accordance with the foregoing description may be made detachable upon a permanent hub or not as desired, and either a single or twin rubber tire may be secured to them by any suitable means.

Having now described my invention what I claim as new and desire to secure by Letters Patent is:—

1. A wire spoked wheel comprising in combination a hub part, a wheel rim, two sets of tension spokes connecting said hub part with two separate circles on said rim, and further tension spokes connecting said hub part with said rim, said latter spokes though having a greater inclination to the center plane of the rim not crossing more than one set of said beforementioned spokes.

2. A wire spoked wheel comprising in combination, a wheel rim, a hub part, a set of tension spokes branching from a part of said hub to a part of said rim, a second set of tension spokes also branching from said hub to another part of said rim in a different plane from the first mentioned part, these two sets of spokes in the case of a driving wheel transmitting the driving and braking forces, and further tension spokes connecting said hub and rim without crossing said beforementioned spokes and acting to strengthen said wheel against lateral stresses.

3. A wire spoked wheel comprising in combination a hub part, a wheel rim, two sets of tension spokes connecting said hub part with two separate circles on said rim, and making substantially equal angles with the center plane of said rim, and further tension spokes connecting said hub part with said rim, said latter spokes though having a greater inclination to the center plane of the rim not crossing more than one set of said beforementioned spokes.

4. A wire spoked wheel comprising in combination a wheel rim, a hub part, a set of tension spokes branching from one end of said hub to the corresponding side of the center plane of the rim, a second set of tension spokes branching from the same end of the hub to the opposite side of the center plane of the rim, these two sets in the case of a driving wheel transmitting the driving and braking forces, and a third set of tension spokes connecting the other end of said hub to the rim, to strengthen said wheel against lateral stresses.

5. A wire spoked wheel comprising in combination a hub part, a wheel rim so disposed that its center plane lies upon the inner side of the center plane of said hub part, two sets of tension spokes connecting the inner end of said hub part with two separate circles on said rim, and a third set of tension spokes connecting the outer end of said hub part with said rim, and making a greater angle with the center plane of said rim than said beforementioned spokes.

6. A wire spoked wheel comprising in combination a hub part, a wheel rim so disposed that its center plane lies upon the inner side of the center plane of said hub part, two sets of tension spokes connecting the inner end of said hub part with the opposite edges of said rim, and making substantially equal angles with the center plane of said rim, and a third set of tension spokes connecting the outer end of said hub part with said rim, and making a greater angle with the center plane of said rim than said beforementioned spokes.

7. A wire spoked wheel comprising in combination a wheel rim, a hub part, a set of tension spokes branching from one end of said hub to the corresponding side of the rim, a second set of tension spokes branching from the same end of the hub, to the opposite side of the rim, these two sets, in the case of a driving wheel, transmitting the driving and braking forces and a further set of tension spokes connecting the other end of said hub to the adjacent side of the rim to strengthen said wheel against lateral stresses.

8. A wire spoked wheel comprising in combination a hub part, a wheel rim so disposed that its center plane is nearest the inner end of the hub, two sets of tension spokes connecting said inner end of the hub with opposite sides of the rim and a third set of tension spokes connecting the outer end of said hub part with said rim, and making a greater angle with the center plane of said rim than said beforementioned spokes.

9. A wire spoked wheel comprising in combination a hub part, a wheel rim so disposed that its center plane is nearest the inner end of the hub, two sets of tension spokes connecting said inner end of the hub with opposite sides of the rim and a third set of tension spokes connecting the outer end of said hub part with said rim.

In testimony whereof I affix my signature in presence of two witnesses.

JOHN VERNON PUGH.

Witnesses:
ERNEST HARKER,
KATHLEEN M. THOMPSON.